United States Patent [19]

Hermansen et al.

[11] Patent Number: 4,940,633

[45] Date of Patent: Jul. 10, 1990

[54] METHOD OF BONDING METALS WITH A RADIO-OPAQUE ADHESIVE/SEALANT FOR VOID DETECTION AND PRODUCT MADE

[76] Inventors: Ralph D. Hermansen, 19136 Nashville St., Northridge, Calif. 91326; Thomas H. Sutherland, 16710 Orange Ave., No. 073, Paramount, Calif. 90723; Roamer Predmore, 13007 Renfrew Cir., Fort Washington, Md. 20744

[21] Appl. No.: 357,154

[22] Filed: May 26, 1989

[51] Int. Cl.$^5$ .................. B05D 3/00; B32B 31/24
[52] U.S. Cl. .................. 428/324; 156/64; 156/330; 156/331.7; 228/104; 428/328; 428/418; 428/460; 428/461; 428/469
[58] Field of Search .................. 156/64, 378, 272.2, 156/330, 331.7; 428/328, 418, 469, 425.8, 447, 460, 461, 324; 228/103, 104; 29/705, 720; 328/57, 58, 62, 44; 523/117, 118, 400; 522/81

[56] References Cited

U.S. PATENT DOCUMENTS

| | | | |
|---|---|---|---|
| 2,798,823 | 7/1957 | Harper | 428/328 |
| 2,886,726 | 5/1959 | Berger | 428/469 |
| 2,916,623 | 12/1959 | Ritchey | 378/58 |
| 3,573,455 | 4/1971 | Suierveld | 156/64 |
| 3,889,122 | 6/1925 | Fletcher | 378/58 |
| 3,956,631 | 5/1976 | Crosby | 378/58 |
| 4,153,769 | 5/1979 | Halm | 526/195 |
| 4,208,470 | 6/1980 | Rabatin | 428/328 |
| 4,419,562 | 12/1983 | Jon | 228/104 |
| 4,440,884 | 4/1984 | Jannusch | 524/26 |
| 4,477,636 | 10/1984 | Muroi | 525/444 |
| 4,533,446 | 8/1985 | Conway | 204/159.24 |
| 4,536,239 | 8/1985 | Benson | 156/64 |
| 4,577,337 | 3/1986 | Light | 378/44 |
| 4,612,242 | 9/1986 | Vesley | 428/313.9 |
| 4,629,746 | 12/1986 | Michl | 523/117 |

*Primary Examiner*—Merrell C. Cashion, Jr.

[57] ABSTRACT

A method and structure for providing radio-opaque polymer compounds for use in metal bonding and sealing. A powder filler comprising a high atomic number metal or compound thereof is incorporated into a polymer compound to render it more radio-opaque than the surrounding metal structures. Voids or other discontinuities in the radio-opaque polymer compound can then be detected by x-ray inspection or other non-destructive radiographic procedure.

14 Claims, No Drawings

METHOD OF BONDING METALS WITH A RADIO-OPAQUE ADHESIVE/SEALANT FOR VOID DETECTION AND PRODUCT MADE

The invention described herein was made in the performance of work under NASA Contract No. NAS5-27316 and is subject to the provisions of Section 305 of the National Aeronautics and Space Act of 1958 (42 U.S.C. 2457).

BACKGROUND OF THE INVENTION

1. Field of the Invention:

The present invention relates generally to adhesives and/or sealants which are used in bonding or sealing metal structures. More particularly, the present invention relates to providing an adhesive and/or sealant which can be inspected for voids after being applied between metal structures.

2. Description of Related Art:

The bond between metal structures achieved with adhesives such as epoxies is, in many cases, better than the bonds achieved using conventional fastening methods such as rivets or screws. Although metal bonding was initially pioneered in aerospace applications, this technology is now being used in a wide range of applications where bonding of metal structures and/or sealing is required. Exemplary applications in addition to aerospace uses include marine applications, military applications, automotive applications and rail applications.

The use of polymeric adhesives to bond metal structures together provides a number of advantages. These advantages include more uniform distribution of stress loads, lightweight bonding, bond strengths equivalent to conventional fastening procedures, and the simultaneous formation of airtight seals while bonding is achieved. A wide variety of polymeric adhesives/sealants are presently available for use in such applications. The majority of the presently available adhesives are epoxy or urethane based materials. These adhesives usually contain a resin, which is a mixture of monomers and polymers, a curing agent, various modifiers and solid filler materials. The amount and kind of solid filler materials present in the adhesive generally determines the bond strength of the material. The filler decreases the brittleness of the adhesive via a crack-stopping mechanism. The adhesives or sealants are supplied as kits which may have some of the ingredients premixed. Immediately prior to use, the curing agent is added to the mixture and then the adhesive is applied to the work surfaces. The surfaces are positioned for bonding and the adhesive is allowed to cure. Alternatively, the mixture can be frozen and its application delayed, i.e., a frozen premix.

In order to ensure optimum metal bonding and/or sealing, it is essential that there be no voids in the adhesive layer. Voids or air channels can occur during the bonding/assembly process. The effectiveness of sealing is reduced by defects such as bubbles, incomplete knit lines or cavities in the adhesive. Injection bonding involves introducing the liquid adhesive mixture into the adhesive joint cavity using external pressure. The flow path of the adhesive may cause entrapped air or result in incomplete knit-lines. It is therefore essential that a method of inspection be devised which can detect such voids in the adhesive layer after assembly of the metal structures.

Exotic methods of non-destructive inspection, such as neutron radiography, are available. However, such exotic inspection methods are extremely expensive and not of practical use. X-ray radiography inspection is a readily available and well-known non-destructive inspection technique. However, the conventional adhesives utilized in metal bonding are not visible by x-ray radiography when surrounded by metal. Accordingly, there is presently a need to provide a simple and inexpensive means for allowing non-destructive testing of metal bonded and/or sealed structures to detect the presence of voids or incomplete knit-lines in the adhesive/sealants.

SUMMARY OF THE INVENTION

In accordance with the present invention, methods and structures are provided which allow x-ray inspection of metal bonded structures to detect the presence of voids in the adhesive layer. The present invention is based on the discovery that when powdered fillers comprising a high atomic number metal are incorporated into an adhesive in sufficient amounts, the adhesive is rendered sufficiently radio-opaque that voids in the adhesive are amenable to x-ray inspection and detection.

The present invention is an improvement upon prior methods and structures for metal bonding and/or sealing wherein two or more metal structures are bonded or sealed with a polymer based adhesive layer. The improvement involves incorporating a sufficient amount of a high atomic number metal filler into the adhesive or sealant to provide a radio-opaque adhesive layer which can be inspected for voids by non-destructive, high-energy radiation inspection. The amount of high atomic number metal filler added to the adhesive must be sufficient to render the adhesive more radio-opaque than the surrounding metal. A wide variety of fillers, adhesives and metal structures are amenable to the present invention provided that the criteria of increased radio-opaqueness for the adhesive is met.

The adhesives and/or sealant compounds in accordance with the present invention are an improvement over existing metal bond and/or sealant materials since they allow simple, inexpensive and non-destructive testing of metal bonded structures utilizing existing x-ray inspection equipment. The above-discussed and many other features and attendant advantages of the present invention will become better understood by reference to the following detailed description.

DESCRIPTION OF THE PREFERRED EMBODIMENTS

The present invention has wide application to metal bonding and/or sealant configurations where two or more metal structures are bonded or sealed utilizing a polymer compound. The bond strength in the adhesive compositions is dependent upon the chemical and physical attachment of the polymer in the adhesive to the adherends; the strength, stiffness and toughness of the adhesive material; and crack-stopping mechanisms due to filler materials. The present invention provides a way to inspect these adhesive compositions for voids after they have been applied between two or more metal structures.

The present invention is based on the discovery that a powder filler comprising a high atomic number metal can be added to conventional metal bonding or sealing compounds to render the compounds more radioopaque than the metal which surrounds them. Consequently, since the radio-opaqueness of the compound is higher than that of the surrounding metal, any voids within the compound layer can be detected during conventional x-ray testing. On the other hand, when prior art adhesives were used, the contrast between the x-ray absorption of the adhesive and of the void space was so small that x-ray photographs did not show the void.

The present invention can be used in connection with any of the conventional adhesives or sealants used in metal bonding and/or sealing. Epoxies are a preferred adhesive since they are, by far, the most commonly used adhesive for metal bonding. Epoxy adhesives are typically comprised of a liquid epoxy resin and a stoichiometric amount of curative. Epoxy resins, such as the diglycidyl ether of Bisphenol A, are available from Shell Chemical, Dow Chemical, or Ciba Geigy. Curatives, such as aliphatic polyamines, are also available from these companies. A particularly preferred epoxy adhesive system is Epiphen 825A available from Monomer, Polymer, Dajac Laboratories (Philadelphia, Pa.). This compound is an epoxy novolac compound which is amine cured at room temperature. These types of epoxies are well-known and include any of the commercially available epoxy paste adhesives. Other suitable types of polymer adhesives which may be used include urethanes, acrylics, phenolics and silicones. The chosen polymer must be capable of being mixed with the filler described herein to provide a mixture with the desired adhesive properties.

The adhesive or sealant mixture typically includes from about 50 to about 95 volume percent resin/curative mixture in combination with from about 5 to about 50 volume percent solid filler. The resin/curative portion of the mix includes the usual curative agents, such as an amine curative agent and, if desired, modifiers such as polysulfides, polyamides, or butadiene rubbers.

In accordance with the present invention, some or all of the solid filler is a powder comprising a high atomic number metal. The amount of the metallic powder filler must be sufficient to increase the radio-opaqueness of the adhesive to a level which is greater than that of the metal structures being bonded and/or sealed. For bonding applications, a mixture of solid fillers, such as mica, in combination with the high atomic weight metal or compound thereof is preferred. The mica provides necessary adhesive strength while the high molecular number metal provides the desired level of radio-opaqueness.

The relative amounts of filler materials will vary widely depending upon the particular metal being bonded and the desired strength of the adhesive bond. For metals such as aluminum, adhesive compositions containing about 67 volume percent polymeric liquids (i.e., resin, curative agent, and modifiers, if used) and about 33 volume percent filler in which the latter comprises between 25 to 75 volume percent powder comprising the high atomic number metal and between about 75 to 25 volume percent mica, provide an adhesive which can be examined for voids using conventional x-ray inspection equipment.

The amount of metal filler necessary to provide sufficient radio-opaqueness or x-ray inspection of aluminum and aluminum alloy structures will usually be at least 5 volume percent of the total resin composition and can be as high as 50 volume percent. For metals such as steel, the minimum of high atomic number metal filler will generally be higher than that required for aluminum structures. Due to the high density of the metal fillers, observations must be made to determine if the fillers settle out of the mixture when high density metal fillers are added. Accordingly, steps must be taken to ensure homogeneous dispersion of the metal filler throughout the resin and the mixture should be promptly applied prior to any settling out of the metal filler. It may be necessary to add a thixotropic filler such as fumed silica powder (0.1 micron) such as Cab-O-Sil, obtained from Cabot Corporation, to retard settling.

The particular high atomic number metal which is used in the present invention is not critical, provided that it increases the radio-opaqueness of the adhesive to a level greater than that of the surrounding bonded metal. Suitable high atomic number metal fillers include those having atomic numbers of from 72 to 82. Tungsten has an atomic number of 74 and is a preferred metal filler. The high atomic number metal may be used in the pure state as a metal or in the form of a compound, such as an oxide, silicate, carbonate, etc. The term "high atomic number metal filler" or "metal filler" as used herein is intended to include the metal and compounds thereof. The amount of metal filler which needs to be incorporated into the resin will vary depending upon the particular metal filler being used and the type of metal structures being bonded. The metal filler must be capable of increasing the radio-opaqueness of the adhesive to desired levels without adversely affecting the adhesive or sealant properties of the compound. The amount of high atomic number metal filler needed for each specific application can be determined easily by preparing adhesives with different levels of the selected metal filler and testing each to determine if the radio-opaqueness is sufficiently high to enable detection of voids by conventional x-ray inspection equipment. Bond strength determinations, such as lap shear strength in accordance with the American Society for Testing and Materials (ASTM) Standard D1002, Standard Test Method for Strength Properties of Adhesives in Shear by Tension Loading (Metal to Metal), should also be performed to assure that bond strength is adequate. If a high atomic number metal compound is used, a larger amount of the compound on a volume basis will be required than of the corresponding free metal in order to achieve a predetermined level of radio-opacity. When such compounds are used, the atomic number of each element and its representation on a volume basis are taken into account in determining the amount of the compound required to achieve a predetermined value of radio-opacity. The advantage of using high atomic number metal compounds is that some of these compounds are naturally occurring materials which are relatively inexpensive. In addition, since these compounds are less dense than their pure metal counterparts, the compounds are easier to keep dispersed in the resin.

The high atomic number metal filler should be in powdered form. The term "powder" is used herein to mean an aggregate of loose, small, solid particles, and these particles may have any shape, such as spherical, needle-like, flakes, prismatic, geometric, or irregular. The particle size of the powdered metal filler must be sufficiently small to allow uniform distribution of the metal throughout the adhesive and to provide optimum radio-opaqueness. Particle sizes in the range of 2 microns to 200 microns are preferred, both for the metals and metal compounds.

The particular metal structures which are bonded in accordance with the present invention can be metal structures such as aluminum, steel, titanium and their alloys. Again, the main consideration is that the amount and type of high atomic number metal filler be chosen so that the radio-opaqueness of the adhesive is greater than that of the particular metal being bonded. As long as this condition is met, detection of voids can be accomplished utilizing conventional x-ray inspection techniques. The thickness of the various metal structures is not particularly critical, provided that the radio-opaqueness of the adhesive layer is sufficiently higher than that of the metal to allow detection of voids. The thickness of the adhesive layer is also not particularly critical. However, x-ray inspection is more amenable to thin layers. Accordingly, it is preferred that the adhesive or sealant layer have a thickness within the range of 0.001 inch (0.002 cm) to 0.25 inch (0.63 cm). Lap shear strength is generally maximized for bondline thicknesses of 0.002 to 0.005 inches (0.005 to 0.012 cm). Lap shear strength decreases gradually as bondline thickness increases. Injection bonding requires thicker bondlines in order to have flow of the liquid.

Examples of practice of the present invention are as follows:

EXAMPLE 1

Epiphen 825A is supplied as a four-part epoxy adhesive kit made up of epoxy resin, polysulfide modifier, mineral filler (mica) and a polyamine curing agent. As previously mentioned, the adhesive kit is available from Monomer, Polymer, Dajac Labs (Philadelphia, Pa.). The separate ingredients are mixed in the relative amounts of 25 parts by weight epoxy, 3 parts by weight polysulfide modifier, 10 parts by weight mica filler, and 4 parts by weight polyamine curing agent. This corresponds to a system which is 67 volume percent liquid resin (epoxy plus modifier plus curing agent) and 33 volume percent solid filler.

Five different modified adhesive compositions were prepared in which powdered tungsten, having an average particle size of about 44 microns, was substituted for a portion of the mica. The filler in the substituted compositions comprised:

5 percent by volume tungsten-95 percent by volume mica;

10 percent by volume tungsten-90 percent by volume mica;

75 percent by volume tungsten-25 percent by volume mica;

50 percent by volume tungsten-50 percent by volume mica; and 25 percent by volume tungsten-75 percent by volume mica.

The various modified adhesives were mixed according to the manufacturer's instructions which follow conventional procedures for mixing and using multi-component epoxy systems. The different modified resins were used to metal bond five different 2 inch by 2 inch (5 cm by 5 cm) test coupons made of aluminum metal. The resulting metal bonded structures were three layer systems having a first aluminum layer which was 0.063 inch (0.16 cm) thick, an intermediate adhesive layer which was 0.014 inch (0.04 cm) thick, and a second aluminum layer of about 0.016 inch (0.04 cm) thickness. The adhesive compositions were room temperature cured under conventional conditions.

The five different metal bonded systems were subjected to x-ray inspection. The inspection was conducted using a Model 4384N x-ray radiograph made by Hewlett-Packard. X-rays having wavelengths of 0.15 and 0.5 angstroms were used during the inspection. A 15 volume percent minimum substitution of tungsten was necessary in order to detect voids in the adhesive layer when 0.5 angstrom x-rays were used. When 0.15 angstrom x-rays were used for inspection, 40 volume percent minimum of tungsten had to be substituted in place of the mica filler in order for voids to be detectable. The five metal bonded aluminum test coupons were tested for adhesive strength in accordance with ASTM D1002. The substitution of tungsten in place of mica in accordance with the present invention did not reduce the normal lap shear strength (namely 2500 pounds per square inch or 17.24 megapascals) which was obtained for Epiphen 825A with a filler consisting of mica only.

EXAMPLE 2

The same Epiphen epoxy adhesive kit used in Example 1 is mixed with powdered tungsten in the following amounts:

67 volume percent liquid resin which includes 25 parts by weight epoxy, 3 parts by weight polysulfide modifier and 4 parts by weight polyamine curing agent.

33 volume percent solid filler which includes 50 weight percent mica and 50 weight percent powdered tungsten having the same average particle size as in Example 1.

The modified resin is used to metal bond two 2 inch by 2 inch (5 cm by 5 cm) coupons of steel. Each metal coupon is about 0.010 inch (0.025 cm) thick and the modified adhesive is applied to provide an adhesive layer which is about 0.015 inch (0.04 cm) thick. The adhesive is subjected to conventional room temperature curing and the resulting structure is examined by x-ray radiography to detect any voids in the adhesive layer, as described in Example 1. The higher tungsten levels used in this example are necessary since steel is more radio-opaque than the aluminum used in Example 1.

EXAMPLE 3

Epon 815, which is an epoxy resin available from Shell Chemical Company, is formulated in the following composition:

a. 100 parts by weight Epon 815 epoxy resin, b. 12 parts by weight triethylene tetramine, and c. 600 parts by weight silver flakes.

The silver flakes are added in order to produce electrical conductivity in the adhesive, such as may be required for electromagnetic interference shielding. The silver flakes, or other oxidatively stable metallic filler, are add in loadings which are high enough to produce particle-to-particle contact.

The modified adhesive is applied as a 0.020 inch (0.05 cm) layer between 2 inch by 2 inch (5 cm by 5 cm) aluminum coupons, each having a thickness of about 0.015 inch (0.04 cm). The resulting sandwich structure is cured in accordance with conventional procedures. The resulting structures are then inspected for voids by x-ray radiograph inspection at 0.15 angstrom and 0.50 angstrom, as described in Example 1.

Gold or platinum fillers may be substituted for the silver flakes described above and would produce increased radio-opacity, but at increased cost.

EXAMPLE 4

The same adhesive as described in Example 2 is used except that the amount of tungsten powder is increased to 80 weight percent of the total solid filler. This adhesive mixture is then used to bond two steel plates together. The resulting structure has an adhesive layer which is 0.025 inch (0.06 cm) thick and metal plates which are each 0.015 inch (0.04 cm) thick. These structures are inspected for voids by x-ray radiography, as described in Example 1. The slight increase in the amount of tungsten used in this example as compared to Example 1 will permit void detection in more highly radio-opaque enclosures.

Having thus described the exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. In a method for bonding together and/or sealing metal structures with an adhesive layer comprising a polymer compound where the possibility exists that voids in the polymer compound may occur, wherein the improvement comprises incorporating a powder filler comprising a high atomic number metal having an atomic number of between 72 and 82 or compound thereof into said polymer compound, wherein the amount of said powder filler in said polymer compound is between about 5 volume percent to 50 volume percent, to provide a radio-opaque polymer compound which is more radio-opaque than the bonded and/or sealed metal structures to thereby allow inspection for voids in the radioopaque polymer compound by non-destructive high energy radiation inspection.

2. An improved method of metal bonding or sealing according to claim 1 wherein the particle size of said powder filler is in the range of between about 2 microns to 200 microns.

3. An improved method of metal bonding or sealing according to claim 1 wherein said powder filler consists essentially of mica and tungsten.

4. An improved method of metal bonding or sealing according to claim 3 wherein the amount of mica is between about 75 to 25 volume percent of said filler and the amount of tungsten is between about 25 to 75 volume percent.

5. An improved method of metal bonding or sealing according to claim 1 wherein said metal structures are made from metals or their alloys selected from the group consisting of aluminum, steel and titanium.

6. An improved method of metal bonding or sealing according to claim 1 wherein said polymer compound is selected from the group consisting of epoxy, urethane, acrylic, phenolic, and silicone polymers.

7. An improved method of metal bonding or sealing according to claim 1 wherein said high atomic number metal powder filler is tungsten.

8. An improved method of metal bonding or sealing according to claim 7 wherein said metal structures are made from aluminum or aluminum alloy.

9. An improved method of metal bonding or sealing according to claim 1 wherein the thickness of said adhesive layer is between about 0.001 inch (0.002 cm) to 0.25 inch (0.63 cm).

10. In an assembly where two metal structures are bonded together or sealed by a polymer compound where the possibility exists that voids in the polymer compound may occur, wherein the improvement comprises incorporating a powder filler comprising a high atomic number metal having an atomic number of between 72 and 82 or compound thereof into said polymer compound, wherein the amount of said powder filler in said polymer compound is between about 5 volume percent to 50 volume percent, to provide a radio-opaque polymer compound which is more radio-opaque than said metal structures to thereby allow inspection for voids in the radio-opaque polymer compound by non-destructive high energy radiation inspection.

11. An improved assembly according to claim 10 wherein the particle size of said powder filler is in the range of between about 2 to 200 microns.

12. An improved assembly according to claim 10 wherein said metal structures are made from metals or their alloys selected from the group consisting of aluminum, steel and titanium.

13. An improved assembly according to claim 10 wherein said powder filler consists essentially of mica and tungsten.

14. An improved assembly according to claim 13 wherein the amount of mica is between about 75 to 25 volume percent of said filler and the amount of tungsten is between about 25 to 75 volume percent.

* * * * *

UNITED STATES PATENT AND TRADEMARK OFFICE
CERTIFICATE OF CORRECTION

PATENT NO. : 4,940,633

DATED : July 10, 1990

INVENTOR(S) : RALPH D. HERMANSEN, THOMAS H. SUTHERLAND and ROAMER PREDMORE

It is certified that error appears in the above-identified patent and that said Letters Patent is hereby corrected as shown below:

Cover page, left column, after "Inventors: ...Washington, Md. 20744", insert Item [73]

--Assignee: Hughes Aircraft Company--.

Before Abstract item [57] insert the following:

--Attorney, Agent, or Firm --M.E. Lachman
                                W.K. Denson-Low--

Signed and Sealed this

Twenty-fifth Day of February, 1992

Attest:

HARRY F. MANBECK, JR.

Attesting Officer       Commissioner of Patents and Trademarks